United States Patent
Sato et al.

(10) Patent No.: US 6,212,517 B1
(45) Date of Patent: Apr. 3, 2001

(54) KEYWORD EXTRACTING SYSTEM AND TEXT RETRIEVAL SYSTEM USING THE SAME

(75) Inventors: Mitsuhiro Sato, Atsugi; Naohiko Noguchi; Yuji Kanno, both of Yokohama; Masako Nomoto, Tokorozawa; Mitsuaki Inaba, Tokyo; Yoshio Fukushige, Fujisawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/106,748

(22) Filed: Jun. 30, 1998

(30) Foreign Application Priority Data

Jul. 2, 1997 (JP) .................................................. 9-176822

(51) Int. Cl.$^7$ ...................................................... G06F 17/30
(52) U.S. Cl. ........................................ 707/5; 707/2; 707/3
(58) Field of Search ................................. 707/2, 3, 4–6

(56) References Cited

U.S. PATENT DOCUMENTS

| | | | |
|---|---|---|---|
| 5,619,410 | 4/1997 | Emori et al. | 704/7 |
| 5,642,518 | 6/1997 | Kiyama et al. | 704/7 |
| 5,826,261 | * 10/1998 | Spencer | 707/5 |

FOREIGN PATENT DOCUMENTS

| | | |
|---|---|---|
| 0 530 993 | 3/1993 | (EP) . |
| WO 97 12334 | 4/1997 | (WO) . |

OTHER PUBLICATIONS

G. Salton, "Automatic Text Processing," 1989, pp. 229–371, Addison–Wesley, Reading, MA.*

Salton G. "Another Look At Automatic Text–Retrieval Systems".

Salton G et al. "Term–Weighting Approaches In Automatic Text Retrieval".

Gelbart D et al. "Beyond Boolean Search: Flexion, A Legal Text–Based Intelligent System".

* cited by examiner

Primary Examiner—Paul V. Kulik
(74) Attorney, Agent, or Firm—Israel Gopstein

(57) ABSTRACT

A system for providing keywords to facilitate a search in a text retrieval system. For each of texts constituting a text base, the system creates a word ID of each of words used in the text and a word occurrence count of a corresponding word. The word occurrence count indicates a number of occurrences of a word in each text. For each of words used in any of the texts constituting the text base, the system creates a total word occurrence count and a containing text count indicative of the number of texts containing the word. For each of words contained in the selected texts, a degree of importance is calculated by using the word occurrence count, the total word occurrence count and the containing text count. The words contained in the selected texts are sorted in order of the degree of importance. At least a part of the sorted words are displayed as related keywords.

75 Claims, 10 Drawing Sheets

TEXT ATTRIBUTE TABLE 710

IN CASE OF TEXT DELETION FROM DDB 70

FIG. 9

| WORD ID Wj | TOTAL WO. COUNT TWO(Wj) | CONTAINING TEXT COUNT CT(Wj) | CT(Wj)/M | EXCEPTION |
|---|---|---|---|---|

FIG. 10

Table TM / T2 / T1:

| EXISTING WORD | EXISTING LOCATION | EXISTING PART |
|---|---|---|
| . . . . . . | | |
| INTERNET | 28 | SUBTITLE |
| WWW | 31 | SUBTITLE |
| RECENTLY | 34 | BODY |
| INTERNET | 36 | BODY |
| GROWTH | 42 | BODY |
| . . . . . | | |

270

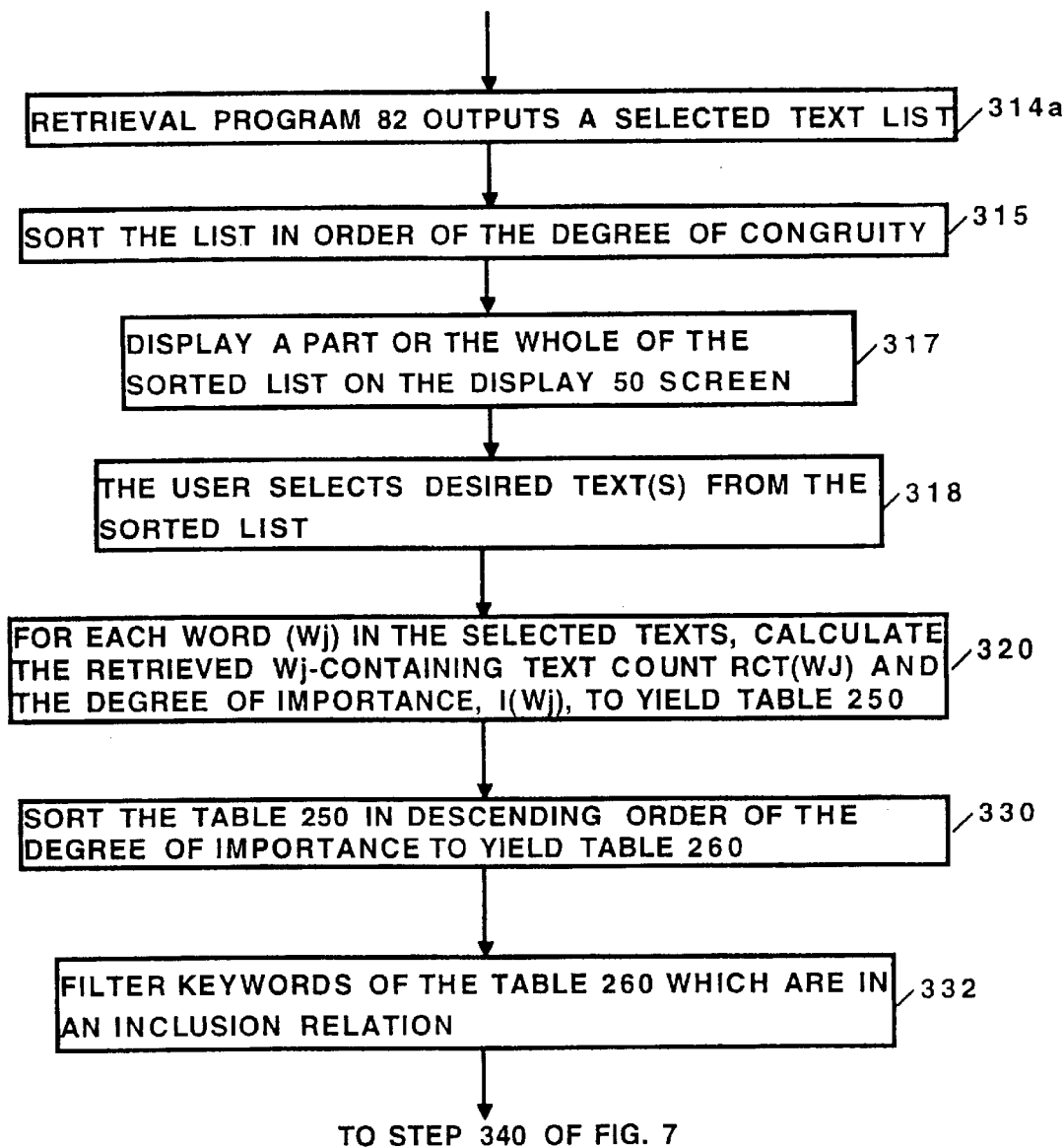

KEYWORD EXTRACTING SYSTEM AND TEXT RETRIEVAL SYSTEM USING THE SAME

BACKGROUND OF THE INVENTION

1. Field of the Invention

The present invention relates to a document retrieval system and more particularly to a subsystem of a document retrieval system for receiving a list of documents (or texts) selected from a text base and providing a list of keywords ranked in order of importance in the selected text group.

2. Description of the Prior Art

In order to retrieve one or more texts which best contain desired information in a conventional text retrieval system, the user has to input an appropriate query request by using keywords which best characterize the desired text(s). However, such keywords hardly occur to the user. It is especially true to those who are not familiar to the field of the desired text(s). For this purpose, various measures have been taken so far which help the user with his or her further searches by displaying related words associated through a kind of dictionary (e.g., a thesaurus, a synonym dictionary, etc.) with the keywords entered by the user. However, it is difficult to obtain related words responsive to characteristics of the desired text(s) because the obtained related words are dependent on a dictionary which has been statically prepared in advance. Further, making a query request by using the obtained related words not always results in a successful retrieval of at least one desired text.

It is therefore an object of the invention to provide a related keyword generating system, used in a document retrieval system, for receiving a list of documents (or texts) selected from a text base and providing a keyword list of words ranked in order of importance in the selected text group so as to facilitate an effective and quick document retrieval.

SUMMARY OF THE INVENTION

The above object is achieved by a method and system of assisting a user to search a text base in a text retrieval system having a function of receiving a query request and returning a list of text IDs of retrieved texts. The method comprises the steps of:

for each of texts constituting the text base, managing local statistical information on words, compound words and phrases (hereinafter, referred to en bloc as "words") used in each said text, managing global statistical information on words used in any of the texts constituting the text base;

the user selecting at least one desired text from the text base;

for each of words contained in the selected text(s), calculating a degree of importance by using the local statistical information for the selected text(s) and the global statistical information;

sorting the words contained in the selected texts in order of the degrees of importance;

displaying a predetermined number of the sorted words as related keywords; and assisting the user to enter a query request by using the related keywords.

BRIEF DESCRIPTION OF THE DRAWING

Further objects and advantages of the present invention will be apparent from the following description of the preferred embodiments of the invention as illustrated in the accompanying drawing, in which:

FIG. 9 is a diagram showing an exemplary structure of an alternative global statistic table 230a used in a first modification of the embodiment, FIG. 10 is a diagram showing a structure of a word location table 270 used for the calculation of weights of a first and second kinds for a text Ti;

FIG. 13 is a part of a flow chart showing a preferred embodiment obtained by modifying some parts of the illustrative embodiment of FIG. 7, wherein connecting the step 314a to the steps 312 and 350 of FIG. 7 and connecting the stop 332 to the step 340 of FIG. 7 forms a complete flow chart;

Throughout the drawing, the same elements when shown in more than one figure are designated by the same reference numerals.

DETAILED DESCRIPTION OF THE PREFERRED EMBODIMENTS

Figure 1:
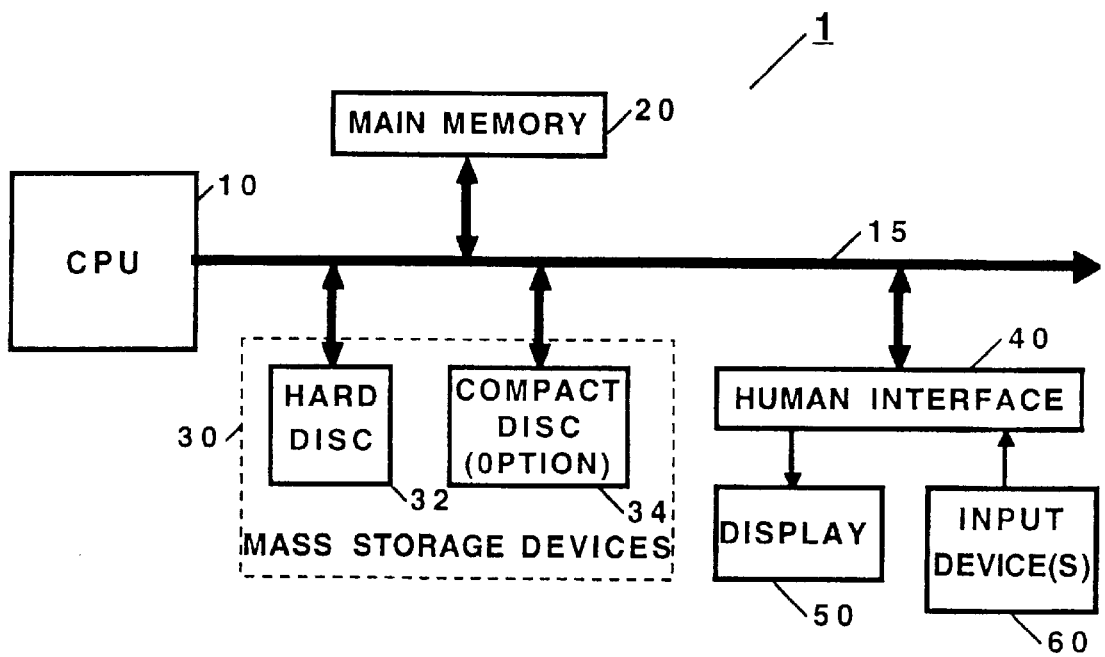
FIG. 1 is a schematic block diagram showing an exemplary arrangement of a computer in which the present invention can be embodied.

FIG. 1 is a schematic block diagram showing an exemplary arrangement of hardware of a related keyword extracting system or a document retrieval system according to the invention. In FIG. 1, the hardware 1 may be any suitable computer system which preferably comprises a central processing unit (CPU) 10; main memory 20; one or more mass storage devices 30 for storing software of the related keyword extracting system or a document retrieval system according to the invention and a human interface 40 which provides interfaces to and from a display device 50 and an input device(s) 60, respectively. The computer system 1 further comprises address and data buses 15 which interconnect the elements 10 through 40. The mass storage devices 30 at least include a hard disc 32 and may optionally include a compact disc (e.g., a CD-ROM) device 34. The input devices 60 may include a keyboard, a mouse, etc.

Figure 2:
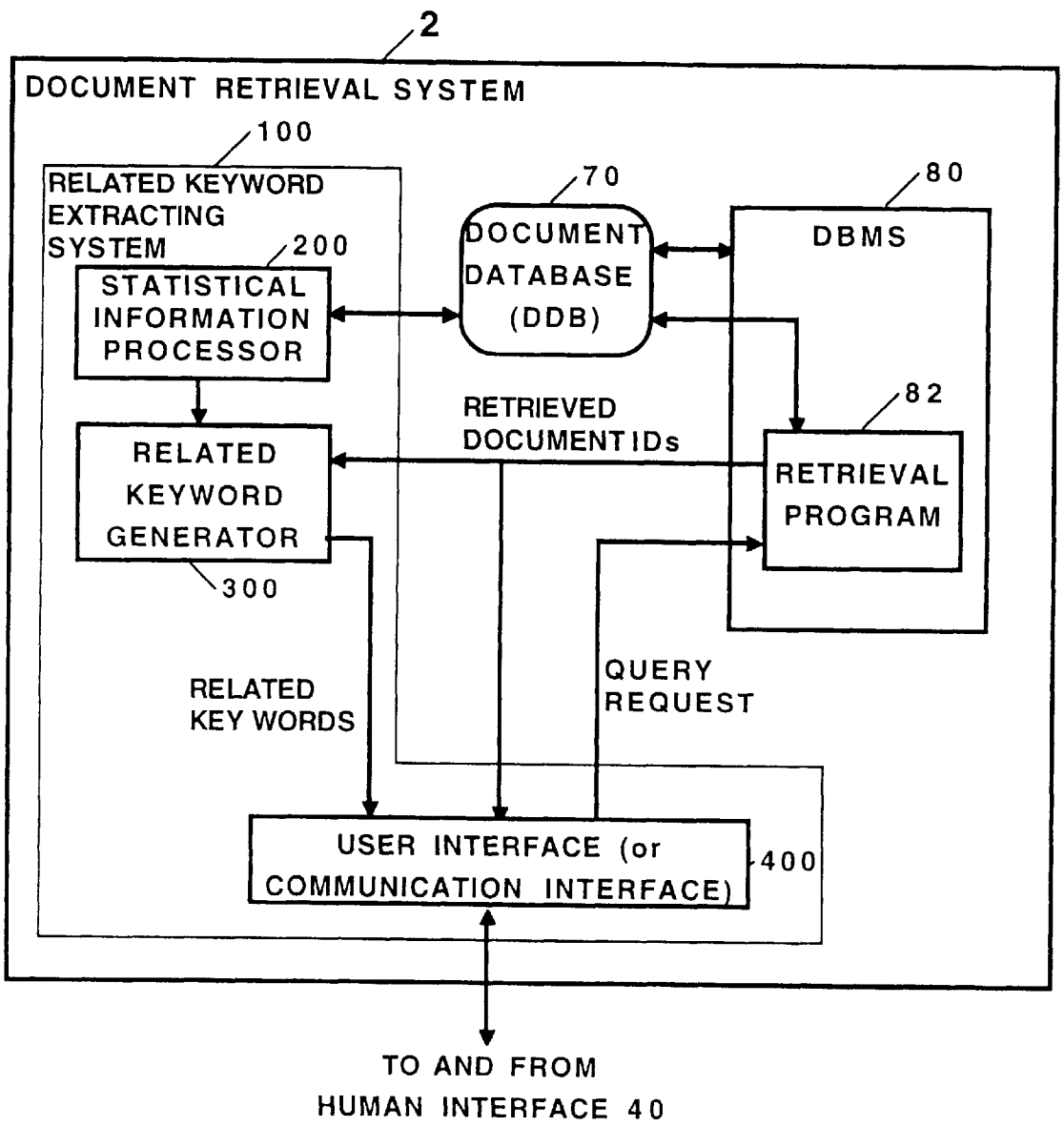
FIG. 2 is a schematic diagram showing an exemplary arrangement of software of a document retrieval system 2 into which a related keyword extracting system 100 is incorporated in accordance with the invention.

FIG. 2 is a schematic diagram showing an exemplary arrangement of software of a document retrieval system 2 into which a related keyword extracting system 100 is incorporated in accordance with the invention. In FIG. 2, the document retrieval system 2 comprises a document database (DDB) 70 which comprises a plurality of document texts; a database management system (DBMS) 80 which at least includes a retrieval function or program 82, and the related keyword extracting system 100. The software elements 70, 80 and 100 are preferably stored in the hard disc 32 of the mass storage device 30. It is noted that the document database 70 may be stored in the compact disc 34 so that the document database is easily exchangeable for another one.

Figure 3:
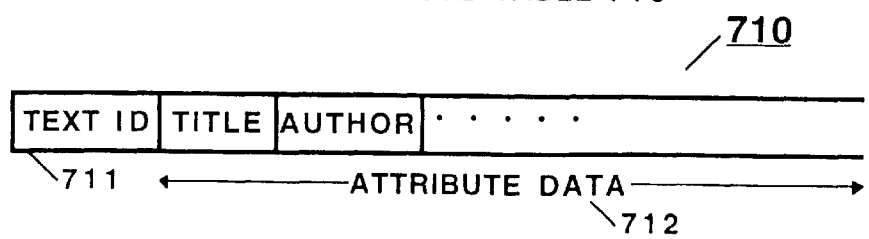
FIG. 3 is a diagram showing an exemplary structure of each record of a text attribute table.

In the document database (DDB) 70, the above-mentioned document texts are associated with respective text IDs T1, T2, . . . , TM, where M is the number of texts registered in DDB 70. A text associated with a text ID of Ti (i is one of the numbers 1 through M) is hereinafter referred to as a "text Ti." Also, DDB 70 preferably includes a text attribute table which contains a record 710 for each of the texts T1 through TM as shown in FIG. 3. Each of the records 710 of the text attribute table comprises a text ID field 711 and other fields 712 which contain various attribute data on the text identified by the text ID in the text ID field. The attribute data includes, e.g., the title, the author(s), classifications, etc. of the text. Alternatively, instead of DDB 70 including the text attribute table, the attribute data for each text may be included as fields or a part of the header in a record or a file, respectively, which contains the text.

The DBMS 80 and/or the retrieval program 82 may be any of database management systems and/or retrieval systems, respectively, suited for the document database 70. The required functions of the retrieval program 82 include the following three search functions—(a) a search (a direct search) by specifying the text ID of a desired text, (b) a search by specifying one or more values of the above-mentioned text attributes, and (c) a search by specifying a Boolean expression using keywords or a combination of keywords and one or more values of the text attributes. Thus, the DBMS 80 and/or the retrieval program 82 may be either a tailored one or a commercially available one as long as it (or they) has (or have) the above-described required functions.

The related keyword extracting system 100 comprises three parts, i.e., a statistical information processor 200, a related keyword generator 300 and a user interface 400 which displays various information (e.g., retrieval results, related keywords, etc.) on the display 50 screen (not shown) and permits the user to enter instructions and data (e.g., a query request) through the input device(s) 60.

Figure 4:
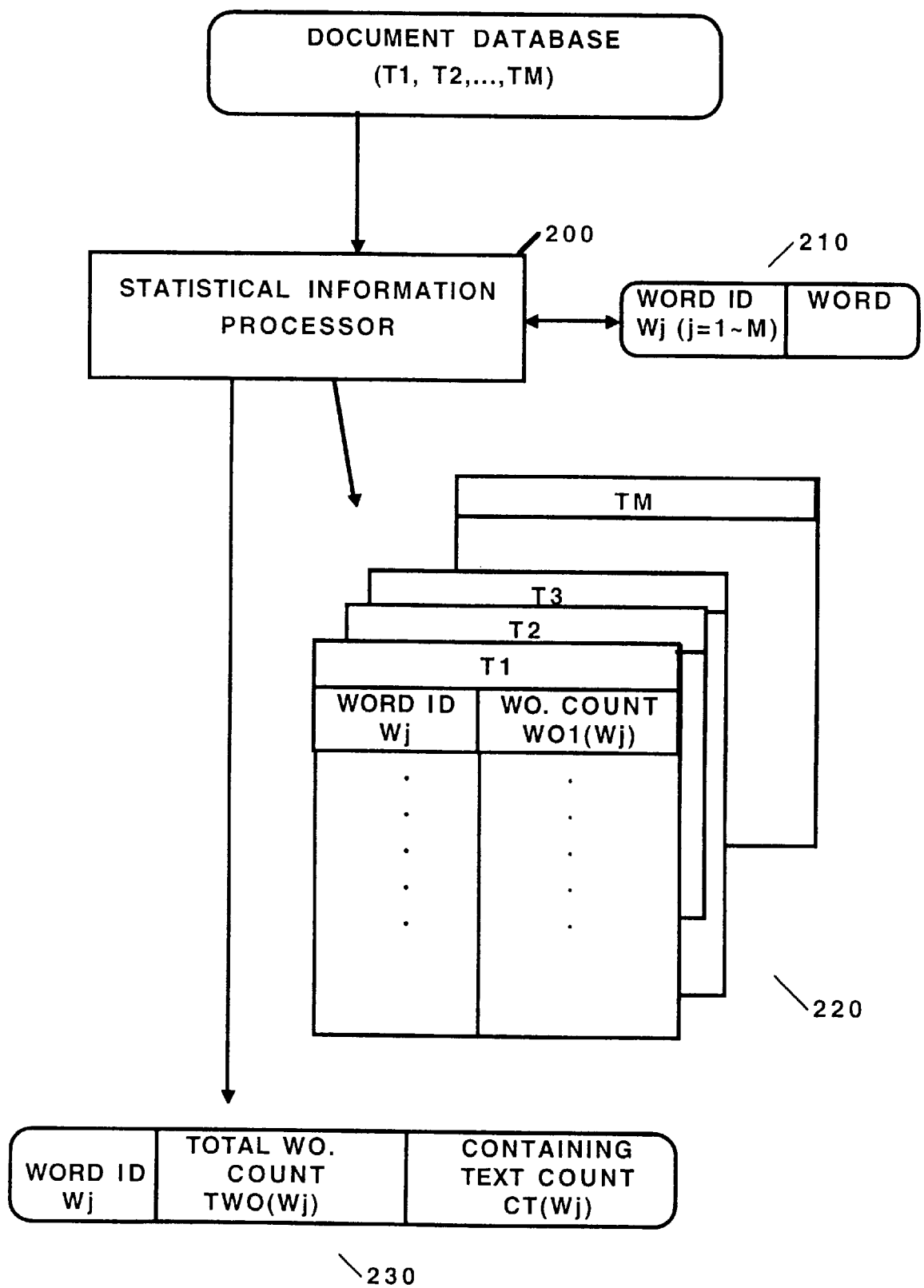
FIG. 4 is a diagram showing a dictionary and tables created and maintained by the statistical information processor 200 of FIG. 2.

FIG. 4 is a diagram showing a dictionary and tables created and maintained by the statistical information processor 200 The statistical information processor 200 creates and maintains a dictionary 210 which contains words (i.e., nouns, verbs, adjectives and adverbs in case of English) used in any of the texts T1 through TM in DDB 70. The dictionary 210 may contain compound words and phrases as well as single words. Each of the records of the dictionary 210 comprises the fields of a word ID) denoted as Wj (j=1, 2, . . . , N) and a corresponding word, where N is the total number of words, compound words and phrases contained in the dictionary 210.

For each text Ti of DDB 70, the processor 200 also creates a local statistic table 220 referring to the dictionary 210. Each record of a local statistic table 220 for a text Ti comprises the fields of a word ID (denoted as Wj) of a word which appears at least once in the text Ti and a word occurrence (WO) count of the word Wj which indicates the number of occurrences of the word Wj in the text Ti and which is denoted as "WOi(Wj)."

The processor 200 further creates and maintains a global statistic table 230 referring to the local statistic tables 220. Each record of the global statistic table 230 comprises the fields of a word ID (denoted as Wj) of a word which appears in any of the texts T1 trough TM of DDB 70, a total word occurrence (WO) count of the word Wj which indicates the number of occurrences of the word Wj in all of the texts T1 through TM and which is denoted as "TWO(Wj)", and a containing text count CT(Wj) which indicates the number of texts containing the word Wj.

Figure 5:
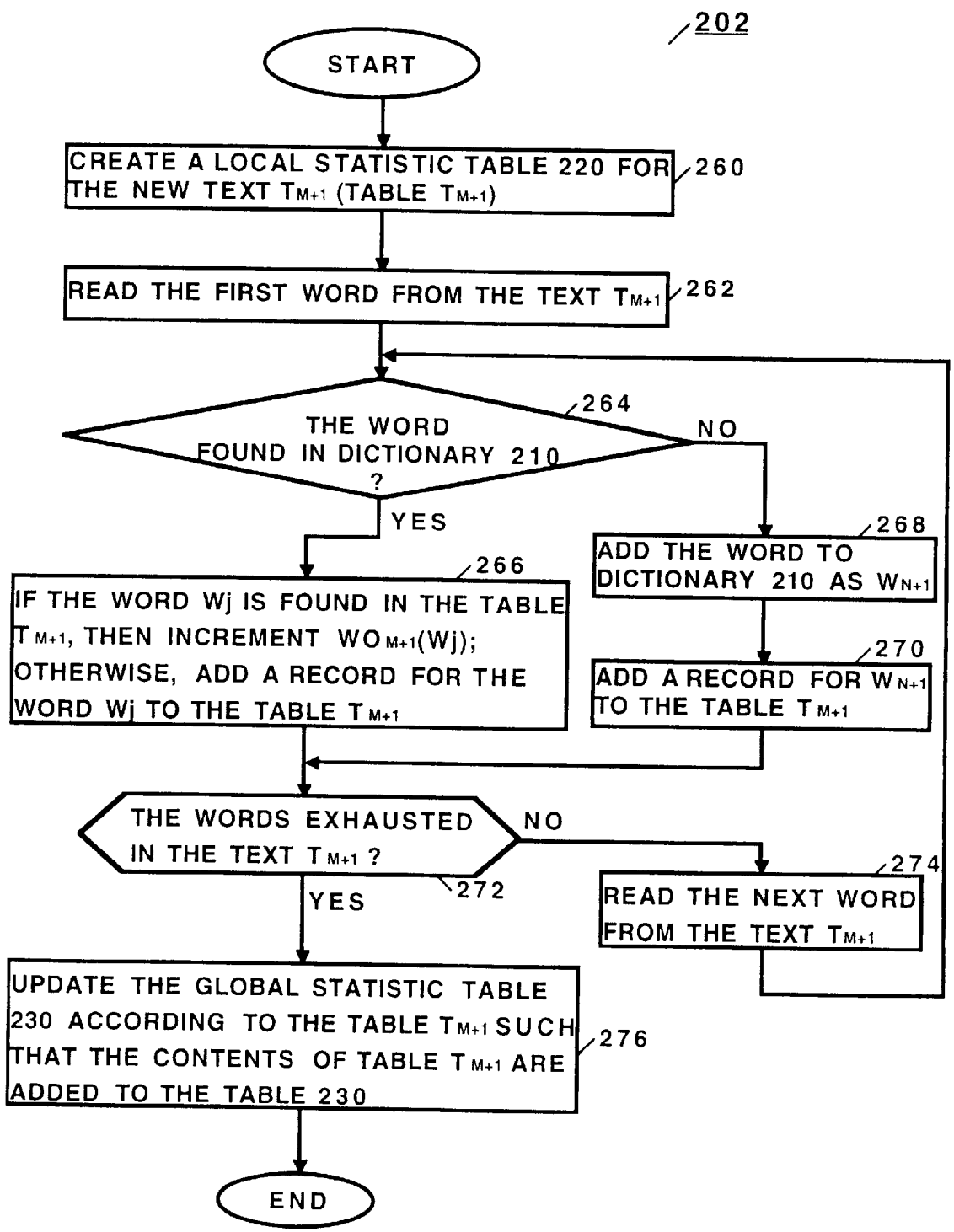
FIG. 5 is a flow chart showing an operation of a first routine of the processor 200 which is invoked to maintain the dictionary 210 and the tables 220 and 230 when a new document text is added to DDB 70.

FIG. 5 is a flow chart showing an operation of a first routine 202 of the processor 200 which is invoked to maintain the dictionary 210 and the tables 220 and 230 when a new document text is added to DDB 70. In response to an addition of a new text $T_{M+1}$ to DDB 70, CPU 10 of FIG. 1 starts the first routine 202 shown in FIG. 5 with step 260. In step 260, CPU 10 creates a local statistic table 220 for the text $T_{M+1}$ (hereinafter referred to as "the table $T_{M+1}$ 220"), which may actually be a file. In the following steps, the first routine 202 scans every word in the new text $T_{M+1}$ to process only such words as can serve as keywords, i.e., nouns, verbs, adjectives, adverbs, compound words, and phrases as mentioned above. However, for the sake of simplicity, we will use "word" to mean such a word as can serve as keyword. Then, in step 262, CPU 10 reads the first word in the text $T_{M+1}$ and proceeds to decision step 264.

In step 264, CPU 10 makes a test to see if the read word is found in the dictionary 210. If so, CPU 10 proceeds to step 266 to register the word, e.g., Wj in the created table $T_{M+1}$ 220. Specifically, if the word Wj exists in the table $T_{M+1}$, then CPU 10 increments the word occurrence count $WO_{M+1}(Wj)$ of the word Wj in the table $T_{M+1}$. Otherwise, CPU 10 adds a record for the word Wj to the table $T_{M+1}$ 220 and sets the WO count $WO_{M+1}(WJ)$ to one. If the test result is NO in step 264, then CPU 10 proceeds to step 268, where CPU 10 adds a record for the word to the dictionary 210, setting the word ID to $W_{N+1}$. Then, CPU 10 adds a record for the word $W_{N+1}$ to the table $T_{M+1}$ 220 and sets the WO count $WO_{M+1}(W_{N+1})$ to one in step 270. Completing the step 266 or 270, CPU 10 proceeds to decision step 272, where CPU 10 makes a test to see if all the words in the text $T_{M+1}$ have been processed. If not, CPU 10 reads the next word in the text $T_{M+1}$ in step 274 and returns to step 264. In this way, CPU 10 repeats the loop comprising the steps 274 and 264 through 272 till the end of the text $T_{M+1}$.

If the test result is YES in step 272, ten in step 276 CPU 10 updates the global statistic table 230 according to the table $T_{M+1}$ 220 such that the contents of table $T_{M+1}$ are added to the table 230. Specifically, CPU 10 identifies a record of the global statistic table 230 which has the same word ID as each (i.e., Wj) of the word IDs contained in the local statistic table $T_{M+1}$ 220. In the identified record (for Wj) of the table 230, CPU 10 updates the values of the total occurrence count field and the containing text count field as follows:

$$TWO(Wj) \Leftarrow TWO(Wj) + WO_{M+1}(Wj), \text{ and}$$

$$CT(Wj) <= CT(Wj)+1.$$

On completing step 276, CPU 10 ends the first routine 202.

Figure 6:
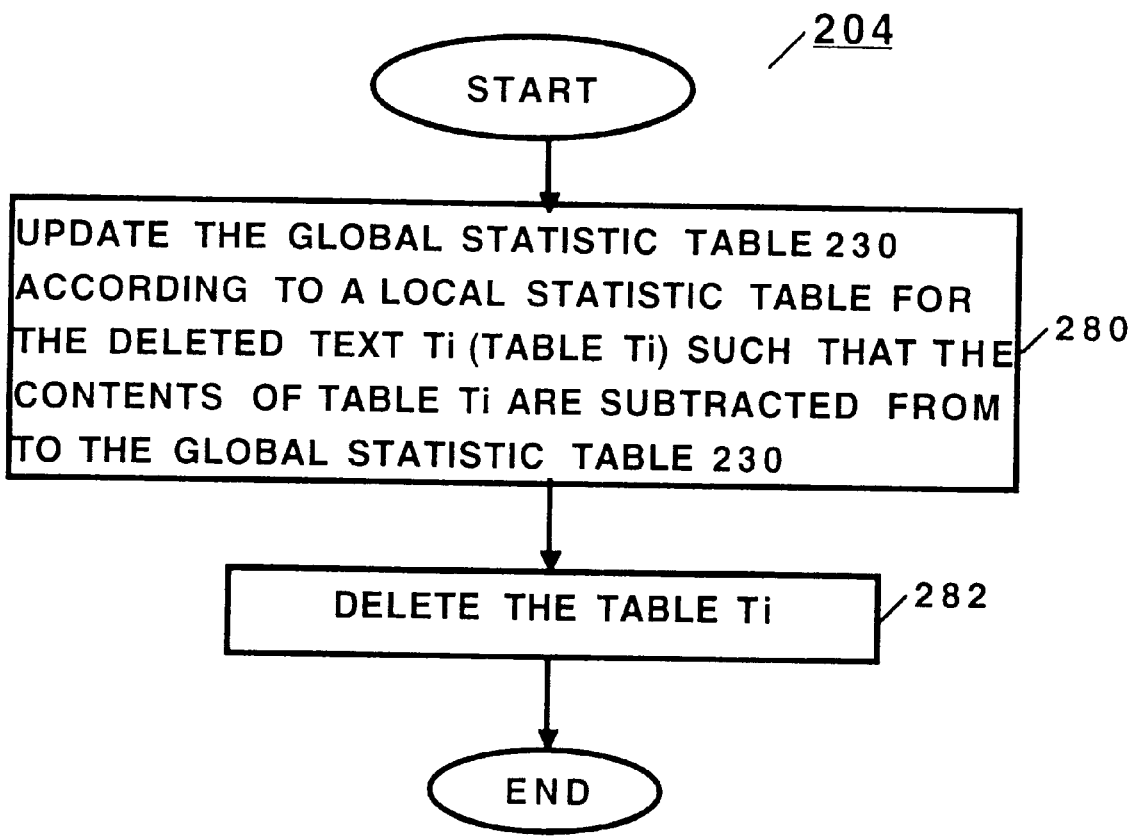
FIG. 6 is a flow chart showing an operation of a second routine of the processor 200 which is invoked to maintain the tables 220 and 230 when a document text Ti is. deleted from DDB 70.

FIG. 6 is a flow chart showing an operation of a second routine 204 of the processor 200 which is invoked to maintain the tables 220 and 230 when a document text Ti is deleted from DDS 70. In response to a deletion of the text Ti from DOD 70, CPU 10 of FIG. 1 starts the second routine 204 with step 280. In step 280, CPU 10 updates the global statistic table 230 according to a local statistic table for the deleted text Ti (table Ti) such that the contents of table Ti 220 are subtracted from to the global statistic table 230. Specifically, CPU 10 identifies a record of the global statistic table 230 which has the same word ID as each (i.e., Wj) of the word IDs contained in the local statistic table Ti 220. In the identified record (for Wj) of the table 230, CPU 10 updates the values of the total occurrence count field and the containing text count field as follows:

$$TWO(Wj) <= TWO(Wj) - WOi(Wj), \text{ and}$$

$$CT(Wj) <= CT(Wj) - 1.$$

Then, CPU 10 deletes the local statistic table Ti. On completing step 282, CPU 10 ends the second routine 204.

Thus, the dictionary 210, the local and global statistic tables 220 and 230 are maintained by the statistical information processor 200. The global statistic table 230 makes it possible to instantly obtain the total number of occurrences of a word, e.g, "internet" in all the texts in DDB 70 and the number of texts which contain the word. Also, a local statistic table 220 for a text with a text ID of, say, 0010 makes it possible to instantly obtain the number of occurrences of a word, e.g., "WWW" in the text No. 0010. The local statistic tables 220 and the global statistic table 230 are used by the related keyword generator 300.

Figure 7:
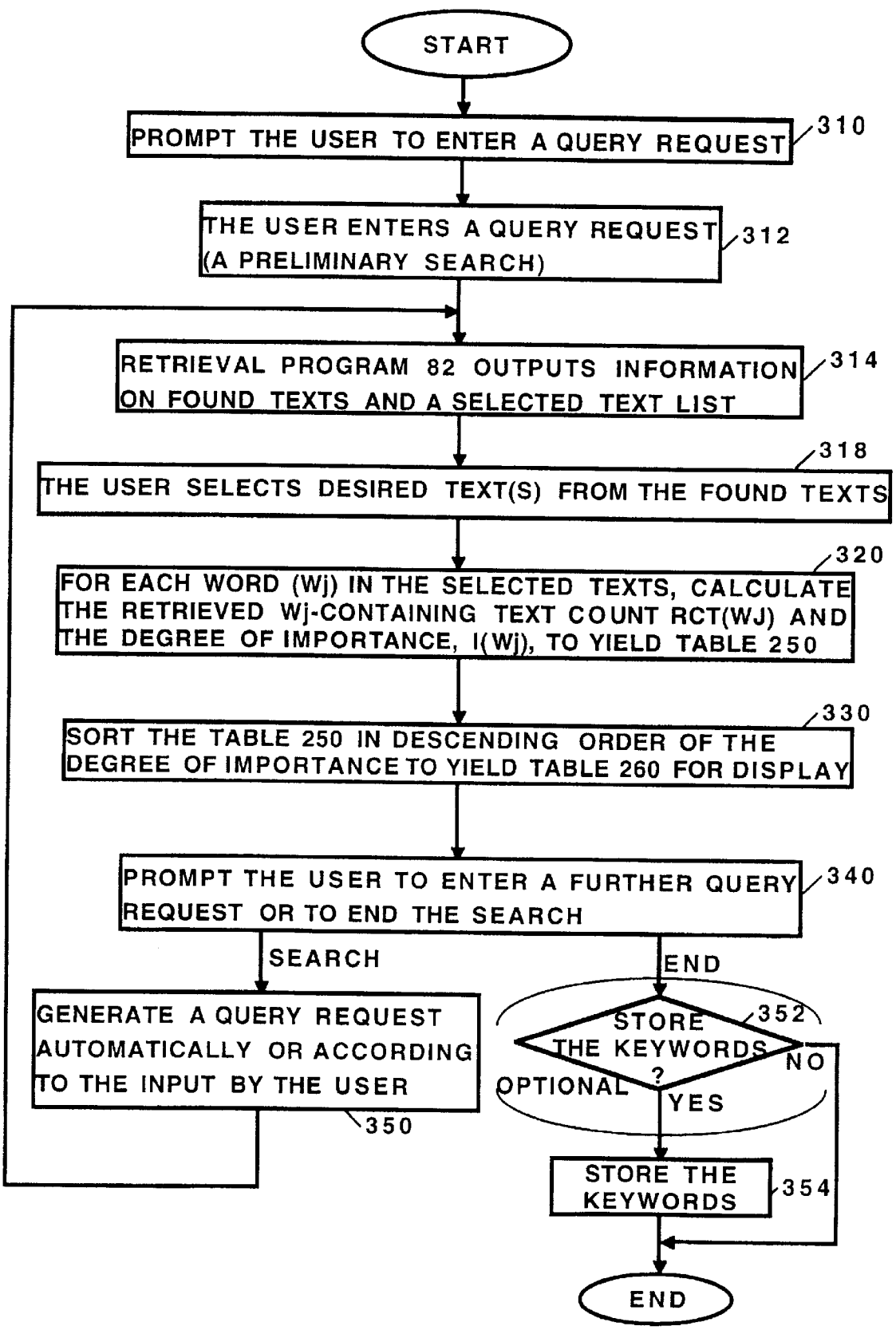
FIG. 7 is a flow chart showing a flow of operation of the document retrieval system 2 which works interactively with the user.

FIG. 7 is a flow chart showing a flow of operation of the document retrieval system 2 which works interactively with the user, If the document retrieval system 2 is started, CPU 10 first prompts the user to enter a query request in step 310. In step 312, the user enters a query request in a well-known manner, e.g., by specifying the text IDs of desired texts, by specifying one or more value of the above-mentioned text attributes, or by specifying a Boolean expression using keywords or a combination of keywords and one or more value of the text attributes. In step 314, the retrieval program 82 searches DDB 70 in accordance with the query request and displays various information on found texts in a well-know manner on the display 50 screen. At the same time, CPU 10 provides a selected text list of text IDs of the found texts in a predetermined manner. In step 318, CPU 10 prompts the user to select at least one desired text (or text which seems to best contains his or her desired information) from the found texts (or the selected text list) to obtain a selected text list comprising text IDs of selected texts.

Figure 8:
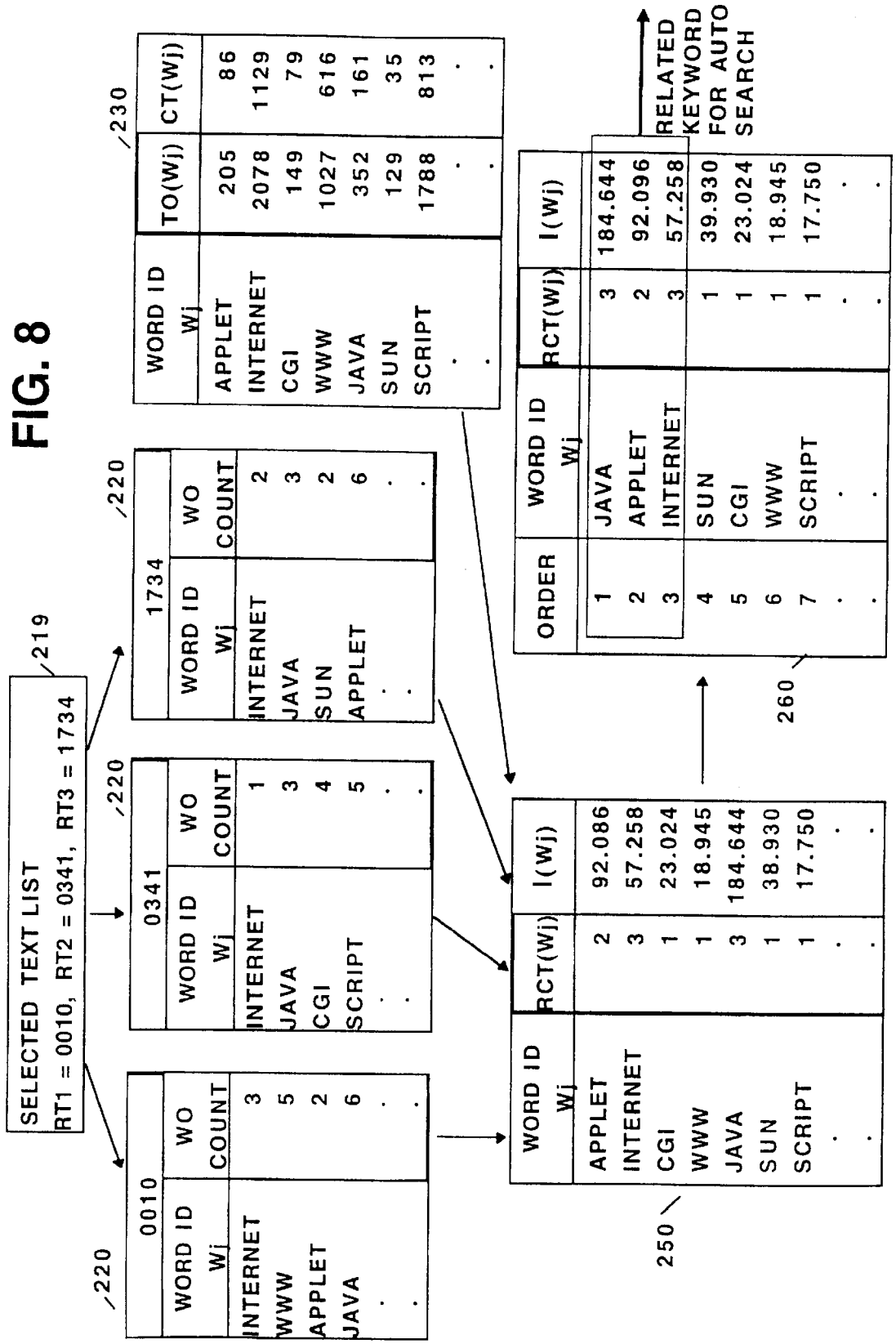
FIG. 8 is a diagram showing an example of processes executed in steps 320 and 330 of FIG. 7.

In response to the selected text list, the related keyword generator 300 calculates in stop 320, for each (Wj) of the words contained in the texts listed in the selected text list, the retrieved Wj-containing text count RCT(Wj) and the degree of importance I(Wj), by using the global table 230 and the local tables 220 of the listed texts to yield a table 250 as shown in FIG. 8. Assuming that the text IDs in the selected text list are expressed as RTr (r=1, 2, ..., R, where R is the number of retrieved texts), the degree of the importance of a word Wj, i.e., I(Wj) is defined as $$I(Wj) = C * \sum_{r=1}^{R} \{WOr(Wj) * IDF(Wj)\} * RCT(Wj), \quad (1)$$

where C is a constant, WOr(Wj) is the number of occurrences of a word Wj in a retrieved text RTr, RCT(Wj) is the number of retrieved texts which contain a word Wj (hereinafter referred to as a "retrieved Wj-containing text count"), and IDF(Wj) is a well-known index called "inverse document frequency" and defined as:

$$IDF(Wj) = 1 - \log(CT(Wj)/M) \quad (2)$$

and is hereinafter referred to as an "IDF value of word Wj", where CT(Wj) is the number of texts of DDB 70 which contain a word Wj and M is the number of the texts of DDS 70 as described above in connection with FIG. 4.

If a word Wj appears in more texts, which means that the word Wj is more common, then the IDF value of Wj becomes the smaller. For this reason, IDF(Wj) contributes to the suppression of the degree of importance for a word commonly used in texts in a relatively wide range. Since I(Ej) includes a factor RCT(Wj), the degree of importance for a word, ie, I(Wj) for a word Wj which appears in more of the retrieved texts becomes high. In other words, words more characteristic of the retrieved texts are given higher degrees of importance. It is noted that a word occurrence count WOr(Wj) in equation (1) may be normalized with a kind of size of a text RTr which contains the word Wj, i.e., with any of the number of letters, the number of the kinds of words, and the total number of occurrences of all the words in the text RTr.

Returning now to FIG. 7, the related keyword generator 300 sorts, in step 330, the records of the table 250 in descending order of the degree of importance to yield a sorted table 260. At the same time, the generator 300 displays a predetermined number, say, 10 of the records with the highest ten degrees of importance. In addition to the degrees of importance, the generator 300 may display various statistical information which has been used in the calculation of the degrees of importance. It is also noted that the obtained keywords and corresponding degrees of importance may be stored as a history of the user. Doing this enables the range of interests or tendencies of the user to be expressed as vectors defined by the keywords and the corresponding degrees of importance. These vectors can be used for various applications, e.g., a search of a document database.

For the purpose of better understanding of the operation of related keyword generator 300, it is assumed that the selected text list consists of three text IDs, eg., 0010, 0341, and 1734. FIG. 8 is a diagram showing how the related keyword generator 300 generates related keywords. It is noted that though in FIG. 8, actual words are used as values for word ID fields in order to facilitate the understanding, it is preferable to actually use word ID data as values for word ID fields, Also, it is assumed that the constant C in equation (1) is 1, and the number M of the texts in DDB 70 is 10,000.

Then, for each (Wj) of the words contained in the retrieved text 0010, 0341 and 1734, the generator 300 calculates the above-mentioned retrieved Wj-containing text count RCT(Wj) and the degree of importance, I(Wj), by using the local statistic tables 220 for the texts 0010, 0341 and 1734 and the global statistic table 230. Taking a word "applet" for example, the generator 300 searches the local statistic tables 0010, 0341 and 1734 for the word "applet" to find that there are two local tables which contain "applet", i.e, RCT(applet)=2. Since the IDF value of "applet" is calculated from equation (2) as:

$$IDF(applet) = 1 - \log(CT(applet)/10{,}000)$$
$$= 1 - \log(86/10{,}000)$$
$$= 5.756$$

the degree of importance for "applet" is calculated from equation (1) as:

$$I(applet) = (2*5.756 + 6*5.756)*2$$
$$= 92.096.$$

For each (Wj) of the other words, RCT(Wj) and I(Wj) are calculated in the same manner to yields a table 250 of FIG. 8. Sorting the table 250 in the descending order of the degree of importance results in a table 260.

Returning now to FIG. 7, CPU 10 prompts the user either to enter a further query request or to end the search in step 340. If the user desires to continue the search, the user interface 400 preferably permits the user either to click a predetermined icon to execute an automatic search or to form a query request by selecting one or more displayed related keywords. If the user selects the automatic search in step 340, then, in step 350, the user interface 400 generates a query request by using a predetermined number, e.g., 3 of related keywords with the highest degrees of importance. If the user selects one or more displayed related keywords in step 340, then the user interface 400 responsively generates a query request. After step 350, CPU 10 returns to step 314.

It is noted that the step 352 may be omitted. That is, CPU 10 may automatically store the keywords before ending the process. Further, the step 354 may be inserted either between steps 330 and 340 or between steps 340 and 350 instead of being placed at the position shown in FIG. 7.

If the user decides to end the search, then the user interface 400 asks the user if the user desires to store the related keywords in step 352. If so, the user interface 400 stores the table 260 for future use in step 354 and the user interface 400 ends its operation. Otherwise, the user interface 400 simply ends its operation.

Thus, the document retrieval system 2 and the related keyword extracting system 100 enables a high-precision document retrieval while ensuring a retrieval of at least one document We have discussed a fundamental embodiment of the invention so far. So, we will discuss some modifications of the above-described embodiment in the following. Since the following modifications are fundamentally similar to the above-described embodiment, the following discussion will be focused on only differences between them.

Modification 1

FIG. 9 is a diagram showing an exemplary structure of an alternative global statistic table 230a used in a first modification of the embodiment. In FIG. 9, the table 230a is identical to the table 230 of FIG. 4 except that the table 230a has been provided with two additional fields for containing the rate of Wj-containing texts with respect to all the texts of DDB 70, i.e., CT(Wj)/M, and a exception flag indicative of whether the word Wj should be excluded from the related keywords, i.e., from the calculation of the degree of importance. If the exception flag for a word Wj is, e.g., one, then the processes from step 320 in FIG. 7 are omitted for the word Wj. Doing this can prevent the words with the exception flag activated from having an adverse effect on the calculation of the degree of importance and raises the speed of process.

There are many ways to determine a criterion of setting the exception flag to one. One way is to set the flag to one in case where the rate CT(Wj)/M is equal to or larger than 0.5. Another way is to set the flag to one in case where CT(Wj)=1, which means that a word Wj appears only one text.

Also, more than one threshold value may be set according to a quantity characteristic of a word, e.g., the length of word. Specifically, the exception flag may be set to one if CT(W,j)/M$\geq$0.5 for words of more than 4 letters, or if CT(Wj)/M$\geq$0.3 for words of 4 letters or less.

According to the modification, only highly useful keywords are obtained. Also, the system operation is speeded up.

Modification 2

In a second modification, the degree of importance, I(Wj), is weighed with a weight (Wr) associated with each (RTr) of the texts selected in step 318. Specifically, the calculation of I(Wj) is executed according to the equation:

$$I(Wj) = C * \sum_{r=1}^{R} \{Wr * WOr(Wj) * IDF(Wj)\} * RCT(Wj), \qquad (3)$$

In order to achieve this, the related keyword generator 300 has to receive weights W1, W2, ..., WR as well as the selected text list (RT1, RT2, ..., RTR). For this purpose, the retrieval program 82 has to have a function of providing the search result in a ranked form. If the retrieved text IDs are provided in order of the degree of congruity, then it is possible to set the weight (W1) of the first-ranked text to 10, the weight (W2) of the second-ranked text to 9, and so on.

Alternatively, in case of a direct search using a plurality of text IDs, the user interface 400 may let the user enter a value (variable in 5 levels for example) indicative of the estimation of each (RTr) of the texts as well as the text IDs. In this case, the possible 5 levels may be used as they are for the weights for the texts, or may be associated with 5 predetermined weight values.

It is noted that a weight value may be a negative one. For example, in case of a direct search, the user is permitted to set the weight to 2 for a highly-related text and to set the weight to –1 for a text of no relation. This can reduce the degree of importance for words which are contained in both of related texts and nonrelated texts and not so common.

Modification 3

A third modification is effective in case where two searches have been executed with the second query condition set stricter than the first one, i.e., where the first selected text list (or a text set A) contains more text IDs than the second one (or a text set B) does. Thus, there is a relation that text set B $\subset$ text set A $\subset$ DDB 70. In this situation, we introduce a distribution index of a word Wj, DI(A, B, Wj), defined by the following equation.

$$DI(A, B, Wj) = \{(MA/CTA(Wj)) * (CTB(Wj)/MB)\}, \qquad (4)$$

where MA and MB are the numbers of texts in the text sets A and B, respectively, and CTA(Wj) and CTB(Wj) are the numbers of texts containing a word Wj in the text sets A and B, respectively.

The degree of importance in the third modification, I2(Wj), is defined as:

$$I2(Wj) = DI(A, B, Wj) * I(Wj). \qquad (5)$$

If a word Wj is widely distributed in set A and narrowly distributed in set B, then the index DI(A,B,Wj) becomes the larger. Such words as raise the value of distribution index largely contribute to the selectivity of set B. In this sense, such word can be said to be keywords more characteristic of set B.

Turning now to FIG. 8, it is assumed that the selected text list 219 is a tert set B, that a text set A including the set B consists of 100 texts, and that each of the following words appears in the corresponding number of texts in the text set A.

| | | |
|---|---|---|
| CTA(applet) | = | 10 |
| CTA(internet) | = | 28 |
| CTA(CGI) | = | 9 |
| CTA(WWW) | = | 14 |
| CTA(JAVA) | = | 20 |
| CTA(SUN) | = | 5 |
| CTA(script) | = | 10 |

According to equation (5), the degree of importance in the third modification is calculated as follows.

| | | |
|---|---|---|
| S2(applet) | = | 92.096*{(100/10) *(2/3)} |
| | = | 613.973 |
| S2(internet) | = | 57.258*{(100/28) *(3/3)} |
| | = | 204.493 |

| | | |
|---|---|---|
| S2(CGI) | = | 85.274 |
| S2(WWW) | = | 45.107 |
| S2(JAVA) | = | 923.220 |
| S2(SUN) | = | 266.200 |
| S2(script) | = | 58.500 |

Sorting the above degree of importance in descending order yields:

| | | |
|---|---|---|
| S2(JAVA) | = | 923.220 |
| S2(applet) | = | 613.973 |
| S2(SUN) | = | 266.200 |
| S2(internet) | = | 204.493 |
| S2(CGI) | = | 85.274 |
| S2(script) | = | 58.500 |
| S2(WWW) | = | 45.107 |

In this example, if the most important three words are to be extracted as related keywords, then the words "JAVA", "applet" and "SUN" will be extracted.

It should be noted that though the distribution index has been provided by equation (4), the distribution index may be given by any suitable expression such as to take the larger value if a word Wj is distributed in more texts in set B and in fewer texts in set A.

Modification 4—Weighting the Degree of Importance

In this modification, the degree of importance I(Wj) (or I2(Wj)) is weighted with various kinds of weights α W(Wj), where α is a parameter indicative of the kind of the weight. Weights of first aid second kinds for a word Wj are dependent on the positions of Wj occurrences in each (RTr) of the texts listed in the selected text list 219. For this reason, the weights of the first and second kinds are calculated for each text RTr and denoted as α Wr(Wj). Accordingly, the degree of importance is calculated by using the weight α Wr(Wj) as follows:

$$I(Wj) = C * \sum_{r=1}^{R} \{\alpha Wr(Wj) * WOr(Wj) * IDF(Wj)\} * RCT(Wj). \quad (6)$$

FIG. 10 is a diagram showing a structure of a word location table 270 used for the calculation of the first and second kinds of weights for a text Ti. The table 270 is created and updated with the above-mentioned local statistic table 220. Each of the records of the word location table 270 comprises an EXISTING WORD field which contains, for each occurrence of a word, the existing word (preferably the word ID), an EXISTING LOCATION field containing the location of the existing word which is measured in the number of words (or the word count) from the start of the text, and an EXISTING PART field which contains a value indicative of which part of the title, the subtitle and the body of the text Ti the existing word is located in. The records of the word location table 270 have been preferably sorted in descending order of the existing location field values.

A weight of the first kind is calculated by using a weight factor associated with the part of a text RTr where a word Wj exists. The part of the text is stored in the EXISTING PART field. This kind of weight is denoted as PWr(Wj) (Since weights are actually calculated for retrieved text, the suffix following PW has been changed to r which is given to a retrieved text). If each of the texts in a DDB 70 comprises a title, a subtitle, and a body, then the weight factors F1, F2 and F3, for text RTr, used in calculating the degree of importance of a word Wj are respectively set to:
e.g., 3 if the word Wj appears in the title,
2 if the word Wj appears in the subtitle, and
1 if the word Wj appears in the body.

Figure 11:
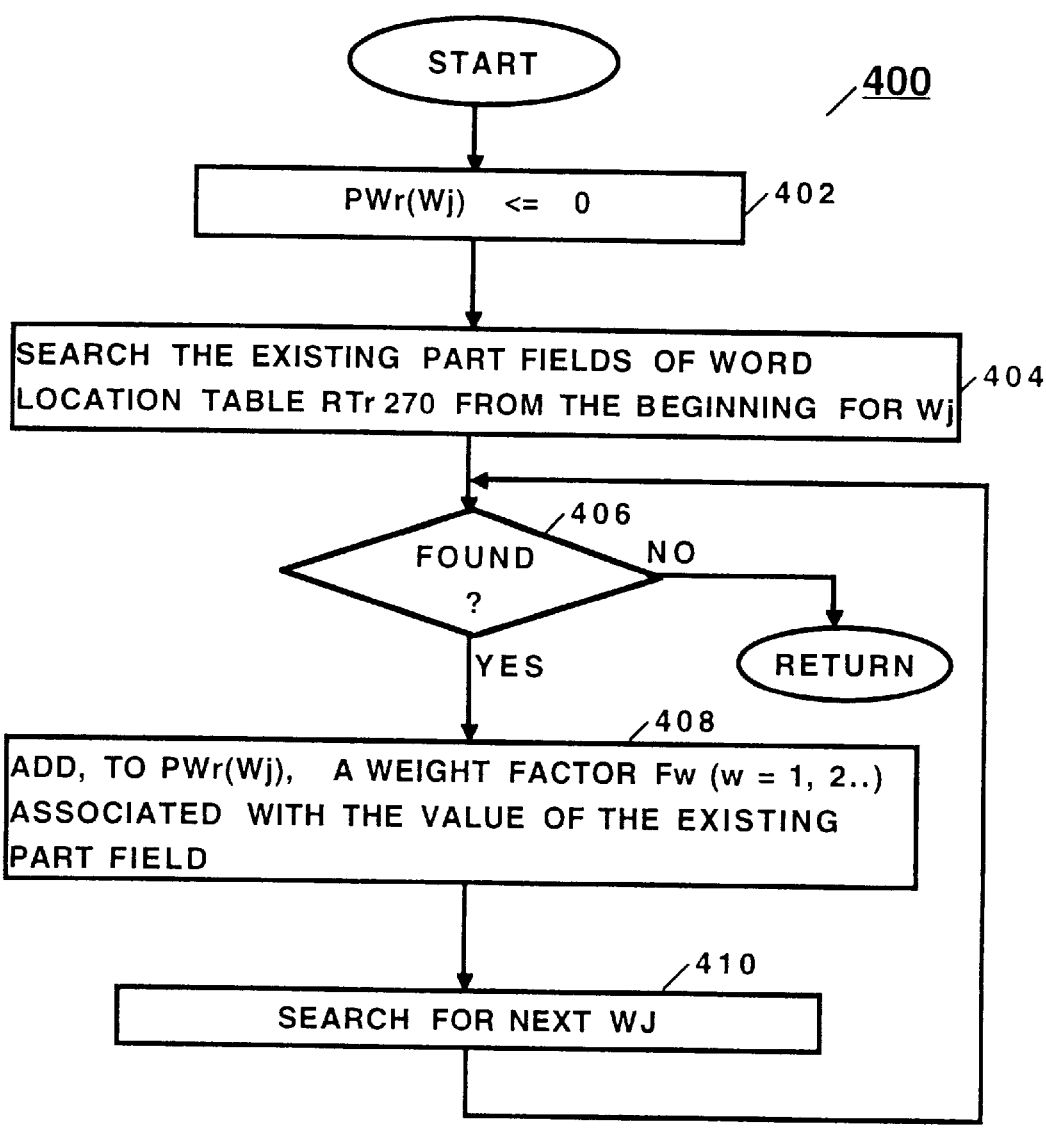
FIG. 11 is a flow chart showing an exemplary operation of a subroutine 400 for calculating a weight PWr(Wj) in accordance with an illustrative embodiment of the invention.

FIG. 11 is a flow chart showing an exemplary operation of a subroutine 400 for calculating a weight PWr(Wj) in accordance with an illustrative embodiment of the invention The subroutine 400 is called for each value of r in step 320 of FIG. 7. In response to a call of subroutine 400, CPU 10 sets the value of PWr(Wj) to zero in step 402. In step 404, C.PU 10 starts searching the existing part fields of word location table RTr 270 from the beginning for Wj. If a word Wj is found in a record in step 406, CPU 10 adds, to the value of PWr(Wj), a weight factor Fw (w=1, 2 or 3 in this example) associated with the value of the existing part field of the record in step 408. Then, CPU 10 resumes the search for Wj in step 410 and returns to step 406. If a word Wj is not found in step 406, then CPU 10 ends the operation to return. At this point, the value of PWr(Wj) has been determined for the text RTr.

A weight of the second kind is calculated by using a weight factor associated with the distance (in the word count) between a location of a Wj-occurrence and a location of an occurrence of a word which has been used as a keyword of a query request in a preceding (or preliminary) document search. The locations of word occurrences are stored in the EXISTING LOCATION field. This kind of weight is denoted as LWr(Wj). In this case, the weight factors F1, F2 and F3, for text RTr, used in calculating the degree of importance of a word Wj is set to:
e.g., 3 if the distance is within two words,
2 if the distance is in a range from three words to 10 words, and
1 if the distance is more than 10 words.

Figure 12:
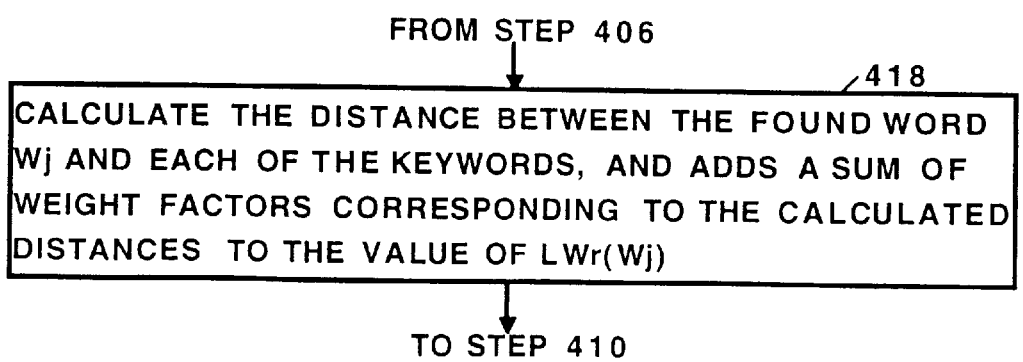
FIG. 12 is a diagram showing a step which is used in place of step 408 in the calculation of a weight LWr(Wj)

In this weighting scheme, a weight LWr(Wj) for each value of r is calculated basically according to the flow chart of FIG. 11 with the exception of step 408. Specifically, if K keywords were used in a query request for the preceding search, then CPU 10 calculates a distance for each of the K keywords, and adds a sum of K weight factors corresponding to the calculated distances to the value of LWr(Wj) as shown as step 418 of FIG. 12.

A weight of a third kind, AW(Wj) may be used. The weight AW(Wj) for a word Wj is determined by an attribute of the word Wj. For example, the weight AW(Wj) is set to:

5 if the word Wj is a proper noun,
4 if the word Wj is a common noun,
2 if the word Wj is an adjective,
1 if the word Wj is either a verb or an adverb, and
0 otherwise Since the weight AW(Wj) is independent of document texts, the degree of importance is weighted with this weight by simply multiplying I(Wj) by AW(Wj).

Referring to FIG. 13, some other modifications will be described.

Modification 5—Ranking the Search Result

In step 314*a* of FIG. 13, CPU 10 (under the control of the retrieval program 82 in this step) simply outputs a selected text list 219 in a predetermined manner without displaying the search result on the display 50 screen. In step 315, CPU 10 sorts the selected text list 219 in order of the degree of congruity. Specifically, CPU 10 calculates the degree of congruity (denoted as DCr) for each (RTr) of the texts contained in the list 219. The degree of congruity DCr is given as:

$$DCr = \sum_{i=1}^{M} \{WOr(Wi) * IDF(Wi)\},$$

where W1, W2, . . . , WM are the words included in the query request of step 312.

In step 317, CPU 10 displays the sorted list on the display 50 screen. In this case, CPU 10 may display only a part of the sorted list. In step 318, CPU 10 prompts the user to select desired texts from the displayed sorted list to obtain a selected text list comprising text IDs of selected texts.

As described above in conjunction with FIG. 7, the user can reuse the keywords which are well suited for DDB 70 to perform a further search. Since it is ensured that such keywords are contained in DDB 70, a search by this embodiment results in a retrieval of at least one text.

Modification 6

Returning to FIG. 13, CPU 10 filters keywords of the sorted keyword table 260 which are in an inclusion relation in step 332. Specifically, it is determined whether there are any inclusion relations either among the extracted words of the table 260, or between any of the extracted words of the table 260 and any of a predetermined group of words. If there is any such relation, one of the extracted words which are involved in the inclusion relation in the former case and the extracted word which is involved in the inclusion relation in the latter case are not displayed. The predetermined group of words may be, for example, the words which have been used in a query request as keywords in a preceding search.

It is determined that a word A is included in a word B if any of the following is the case.

(a) The words A and B coincide with each other in the front and the word A is shorter than word B.
(b) The words A and B coincide with each other in the rear and the word A is shorter than word B.
(c) The word A is a part of the word B and the words A and B coincide with each other neither in the front nor in the rear.
(d) The words (or phrase) A and B satisfies any of the above conditions (a) through (c) and the word A is a component of the phrase B.

For example, "東京" determined to be a constituent word of "東京都" according to criterion (a). Similarly, criterion (b) makes "発売" constituent word of "新発売", and criterion (c) makes "感謝" a constituent word "大感謝祭." It is noted that the criterion (4) is necessary for a judgment of a constituent word in English. According to criterion (4), words "artificial" and "intelligence" are determined to be constituent words of a word "artificial intelligence", but words "art" and "tell" are not.

If any two words or phrases are determined to be in an inclusion relation in accordance with the above-described criterion, then any of the following actions is taken.

(a) The longer word (or phrase) is selected for a keyword.
(b) The shorter word (or phrase) is selected for a keyword.
(c) The more important word (or phrase) is selected for a keyword.
(d) The shorter (in word count) phrase and the difference between the longer (in word count) phrase and the shorter phrase are used for a keyword (or a key phrase).

If an inclusion relation between "artificial" and "artificial intelligence" is found, "artificial" and "intelligence" is used for a keyword in accordance with the criterion (d). In case of an inclusion relation between extracted words, any of the above-mention actions can be taken. However, only the action (3) is possible to an inclusion relation involving any of the words in a predetermined word group.

According to this modification, words which are similar in meaning or usage are excluded from a keyword group, permitting the redundancy of the related keywords to be reduced.

Modification 7

The extracted keywords are classified by attributes or statistical information. Parts of speech may be used as attributes. For example, proper nouns and the other words are separately displayed. Alternatively, the extracted keywords may be classified for display in accordance with a classification of a thesaurus.

As a classification by statistical information, the extracted keywords may be classified by the number of occurrences of each of the extracted keywords. If, for example, the extracted keywords are classified by a judgment of whether the word appears in 80% of the whole text base, it permits the user to make certain the effect of a further search using the word before hand.

Also, in case of classification by a thesaurus instead of displaying word groups as they are, words which are positioned at higher nodes in the thesaurus may be displayed as representative words. Similarly, in case where the extracted keywords are grouped by statistical information, a word most widely distributed in each word group may be displayed as representative word instead of the group.

Figure 14:
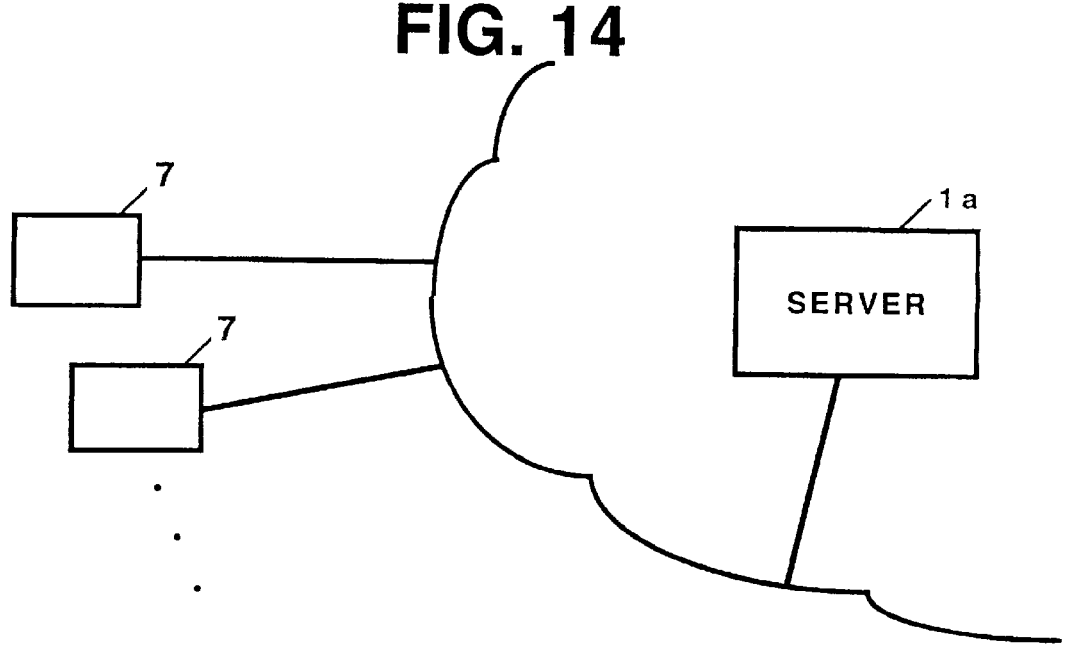
FIG. 14 is a schematic diagram showing an exemplary network on which a related keyword extracting system and a document retrieval system can be embodied in accordance with the principles of the invention.

Other variations are possible. For example, the document retrieval system has been embodied by using a single computer in the above embodiment. However, a document retrieval system may be embodied on a network system as shown in FIG. 14. In such a system, the user interface 400 is stored in each of client computers or terminals 7, and the rest of the document retrieval system is stored in a server 1*a*.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of assisting a user to search a text base in a text retrieval system having a function of receiving a query request and returning a list of text IDs of retrieved texts; the method comprising the steps of:

for each of texts constituting said text base, managing local statistical information on words, compound words and phrases (hereinafter, referred to en bloc as "words") used in each said text;

managing global statistical information on words used in any of said texts constituting said text base;

said user selecting at least one text from said text base to provide a selected text list of text IDs of selected texts by user implementation of the steps of:

issuing a query request by using user determined retrieval conditions to obtain a list of retrieved texts, and selecting at least one text from said retrieved texts;

for each of words contained in said selected texts, calculating a degree of importance by using said local statistical information for said retrieval texts and said global statistical information;

sorting said words contained in said selected texts in order of said degrees of importance;

displaying a predetermined number of said sorted words as related keywords; and assisting said user to enter a query request by using said related keywords.

2. A method as defined in claim 1, wherein said step of managing local statistical information includes the step of including, in said local statistical information, a word ID of each of words used in each said text and a word occurrence count associated with said word ID, said word occurrence count indicating a number of occurrences, in each said text, of each said word used in each said text, wherein said step of managing global statistic information includes the step of including, in said global statistical information, a word ID of each of said words used in any of said text constituting said text base, a total word occurrence count and a containing text count which are associated with said word ID of each said word used in any said text said total word occurrence count indicating a total number of occurrences in all of said texts constituting said text base and said containing text count indicating a number of texts containing each said word used in any said text, and wherein the method further comprises the step of defining said degree of importance such that said degree of importance is proportional to a sum of said word occurrence counts taken for said retrieved texts, a number of said retrieved texts, and a quantity defined for each said word contained in said retrieved texts such that if each said word appears in more of said texts constituting said text base, said quantity becomes the smaller.

3. A method as defined in claim 2, wherein said step of defining said degree of importance comprises the step of expressing said degree of importance I(Wj) as:

$$I(Wj) = C * \sum_{r=1}^{R} \{WOr(Wj) * IDF(Wj)\} * RCT(Wj),$$

where Wj is a word ID of each said word contained in said retrieved texts, C is a constant, WOr(Wj) is said word occurrence count of each said word Wj in each said retrieved text RTr, RCT(Wj) is a number of said retrieved texts which contain each said word Wj, and IDF(Wj) is said quantity, where RTr is a text ID of each said retrieved text and r=1, 2, . . . , R (R=a number of retrieved texts).

4. A method as defined in claim 1, further comprising the steps of:

said user issuing a further query request to obtain such a smaller list as is a subset of said list;

calculating a distribution index for each said word contained in said selected texts by using statistical information on words used in said selected texts and statistical information on words contained in texts listed in said smaller list, said distribution index being so defined that if each said word contained in said selected texts is distributed in more of texts listed in said smaller list and distributed in less of said selected texts, said index becomes larger; and weighting said degree of importance with said distribution index.

5. A method as defined in claim 4, wherein said distribution index is expressed as {(MA/CTA(Wj))*(CTB(Wj)/MB) }, where MA and MB are numbers of texts listed in said list and said smaller list, respectively, and CTA(Wj) and CTB(Wj) are numbers of texts which are listed in said list and said smaller list, respectively, and which contain each said word Wj contained in said selected texts.

6. A method as defined in claim 2, wherein said selected text list is sorted in order of degrees of congruity of said selected texts, wherein the method further comprises the step of receiving said sorted list and assigning each of said selected texts of said sorted list a predetermined weight, and wherein said step of calculating said degree of importance includes the step of weighting said word occurrence count with said predetermined weight.

7. A method as defined in claim 2, further comprising the steps of:

assigning a weight to each of said selected texts, wherein said step of calculating said degree of importance includes the step of weighting said word occurrence count for each said selected text with said weight assigned to each said selected text.

8. A method as defined in claim 1, further comprising the steps of:

for each said word contained in said selected texts, making a test to see if a number of texts containing the word is within a predetermined range; and if said word did not pass said test, excluding said word from candidates of said related keywords.

9. A method as defined in claim 8, further comprising the step of using, as said predetermined range, a value associated with a quantity characteristic of said word.

10. A method as defined in claim 9, wherein said quantity is a length of said word.

11. A method as defined in claim 8, further comprising the step of associating each of second predetermined ranges of a quantity characteristic of said word with a different predetermined range of said number of texts containing the word, wherein said step of making a test includes the step of using, as said predetermined range, one of said different predetermined ranges associated with a second predetermined range on which said quantity characteristic of said word falls.

12. A method as defined in claim 2, further comprising the steps of:

for each of texts constituting said text base, managing each occurrence of each said word in each said text constituting said text base and a part, of each said text, of said each occurrence;

assigning each of possible parts of each said text a predetermined weight factor; and for each said text, accumulating said predetermined weight factor associated with said part of said each occurrence of each said word to yield a weight by text to each said word, wherein said step of defining said degree of importance includes the step of weighting each of said word occurrence counts with said weight by text.

13. A method as defined in claim 1, farther comprising the steps of:

for each of texts constituting said text base, managing each occurrence of each said word in each said text constituting said text base and a location, in each said text, of said each occurrence;

calculating, for said each occurrence of each said word in each said text, a distance between said location and a location of each of keywords used in said query request;

assigning each of predetermined distance ranges a predetermined weight factor; and for each of texts constituting said text base, accumulating said predetermined weight factor associated with said distance for each said keyword for said each occurrence of each said word to yield a weight by texts to each said word, wherein said step of defining said degree of importance includes the step of weighting each of said word occurrence counts with said weight by text.

14. A method as defined in claim 1, further comprising the step of weighting said degree of importance with a weight associated with an attribute of each said word in said selected texts.

15. A method as defined in claim 1, further comprising the step of:

if any inclusion relation is found either in any two of said sorted words or between any of said sorted words and any of keywords used in said query request, selecting one of two words involved in said inclusion relation on a basis of a predetermined criterion.

16. A method as defined in claim 15, further comprising the step of setting said predetermined criterion for a comparison of lengths between said two words involved in said inclusion relation.

17. A method as defined in claim 15, further comprising the step of setting said predetermined criterion for a comparison of degrees of importance between said two words involved in said inclusion relation.

18. A method as defined in claim 15, wherein said step of selecting one of two words includes the step of selecting a shorter words and/or a difference between said two words.

19. A method as defined in claim 3, further comprising the steps of:

on a basis of keywords used in said query request and said list from said function, sorting said list in order of degrees of congruity of said selected texts; and assigning each of said selected texts of said sorted list a predetermined weight, wherein said step of expressing said degree of importance includes the step of weighting said word occurrence count WOr(Wj) with one of said predetermined weights associated with each said retrieved text RTr.

20. A method as defined in claim 1, further comprising the step of classifying said sorted words by attributes of said sorted words into groups of similar keywords for display.

21. A method as defined in claim 1, further comprising the step of classifying said sorted words by statistical data of said sorted words into groups of similar keywords for display.

22. A method as defined in claim 1, further comprising the step of classifying said sorted words by a thesaurus into groups of similar keywords for display.

23. A method as defined in claim 20, further comprising the step of displaying representative keywords in place of said groups.

24. A method as defined in claim 21, further comprising the step of displaying representative keywords in place of said groups.

25. A method as defined in claim 22, further comprising the step of displaying representative keywords in place of said groups.

26. A method as defined in claim 1, wherein said assisting said user includes the step of, in response to a predetermined input from said user, automatically generating said query request by using at least a part of said predetermined number of said related words.

27. A method as defined in claim 1, further comprising the steps of storing said predetermined number of said related words; and in response to a predetermined input from said user, displaying said stored predetermined number of said related words.

28. A system for assisting a user to search a text base in a text retrieval system having a function of receiving a query request and returning a list of text IDs of retrieved texts; the system comprising:

means, operative for each of texts constituting said text base, for managing local statistical information on words used in each said text;

means for managing global statistical information on words used in any of said texts constituting said text base;

means for permitting said user to select at least one text from said text base to provide a selected text list of text IDs of selected texts by permitting said user to issue a query request by using user determined retrieval conditions to obtain a list of retrieved texts and by permitting said user to select at least one text from said retrieved texts;

means, operative for each of words contained in said selected texts listed in said selected text list, for calculating a degree of importance by using said local statistical information for said retrieval texts and said global statistical information;

means for sorting said words contained in said selected texts in order of said degrees of importance;

means for displaying a predetermined number of said sorted words with highest degrees of importance as related keywords; and means for assisting said user to enter a query request by using said related keywords.

29. A system as defined in claim 28, wherein said means for managing local statistical information includes means for including, in said local statistical information, a word ID of each of words used in each said text and a word occurrence count associated with said word ID, said word occurrence count indicating a number of occurrences, in each said text, of each said word used in each said text, wherein said means for managing global statistic information includes means for including, in said global statistic information, a word ID of each of said words used in any of said texts constituting said text base, a total word occurrence count and a containing text count which are associated with said word ID of each said word used in any said text, said total word occurrence count indicating a total number of occurrences in all of said tests constituting said text base and said containing text count indicating a number of texts containing each said word used in any said text, and wherein the system further comprises means for defining said degree of importance such that said degree of importance is proportional to a sum of said word occurrence counts taken for said selected texts, a number of said selected texts, and a quantity defined for each said word contained in said selected texts such that if each said word appears in more of said texts constituting said text base, said quantity becomes the smaller.

30. A system as defined in claim 29, wherein said means for defining said degree of importance comprises means for expressing said degree of importance I(Wj) as:

$$I(Wj) = C * \sum_{r=1}^{R} \{WOr(Wj) * IDF(Wj)\} * RCT(Wj),$$

where Wj is a word ID of each said word contained in said selected texts, C is a constant, WOr(Wj) is said word occurrence count of each said word Wj in each said retrieved text RTr, RCT(Wj) is a number of said selected texts which contain each said word Wj, and IDF(Wj) is said quantity, where RTr is a text ID of each said retrieved test and r=1, 2, . . . , R (R=a number of selected texts).

31. A system as defined in claim 28, further comprising: means, responsive to a determination that a further query request from said user has caused said function to return such a smaller list as is a subset of said list, for calculating a distribution index for each said word contained in said selected texts by using statistical information on words used in said selected texts and statistical information on words contained in texts listed in said smaller list, said distribution index being so defined that if each said word contained in said selected texts is distributed in more of texts listed in said smaller list and distributed in less of said selected texts, said index becomes larger; and means for weighting said degree of importance with said distribution index.

32. A system as defined in claim 31, wherein said distribution index is expressed as {(MA/CTA(Wj))*(CTB(Wj)/MB)}, where MA and MB are numbers of texts listed in said list and said smaller list, respectively, and CTA(Wj) and CTB(Wj) are numbers of texts which are listed in said list and said smaller list, respectively, and which contain each said word Wj contained in said selected texts.

33. A system as defined in claim 29, wherein said list is sorted in order of degrees of congruity of said selected texts, wherein the system further comprises means for receiving said sorted list and assigning each of said selected texts of said sorted list a predetermined weight, and wherein said means for calculating said degree of importance includes means for weighting said word occurrence count with said predetermined weight.

34. A system as defined in claim 29, further comprising means for permitting said user to assigning a weight to each of said selected texts, wherein said means for calculating said degree of importance includes means for weighting said word occurrence count for each said selected text with said weight assigned to each said selected text.

35. A system as defined in claim 28, further comprising:
means, operative for each said word contained in said selected texts, for making a test to see if a number of texts containing the word is within a predetermined range; and means, responsive to a determination that said word did not pass said test, for excluding said word from candidates of said related keywords.

36. A system as defined in claim 35, further comprising means for using, as said predetermined range, a value associated with a quantity characteristic of said word.

37. A system as defined in claim 36, wherein said quantity is a length of said word.

38. A system as defined in claim 35, further comprising means for associating each of second predetermined ranges of a quantity characteristic of said word with a different predetermined range of said number of texts containing the word, wherein said means for making a test includes means for using, as said predetermined range, one of said different predetermined ranges associated with a second predetermined range on which said quantity characteristic of said word falls.

39. A system as defined in claim 29, further comprising:
means, operative for each of texts constituting said text base, for managing each occurrence of each said word in each said text constituting said text base and a part, of each said text, of said cach occurrence;

means for assigning each of possible parts of each said text a predetermined weight factor; and means operative for each said text for accumulating said predetermined weight factor associated with said part of said each occurrence of each said word to yield a weight by text to each said word, wherein said means for defining said degree of importance includes means for weighting each of said word occurrence counts with said weight by text.

40. A system as defined in claim 28, further comprising:
means, operative for each of texts constituting said text base, for managing each occurrence of each said word in each said text constituting said text base and a location, in each said text, of said each occurrence;

means for calculating, for said each occurrence of each said word in each said text, a distance between said location and a location of each of keywords used in said query request;

means for assigning each of predetermined distance ranges a predetermined weight factor; and means, operative for each of texts constituting said text base, for accumulating said predetermined weight factor associated with said distance for each said keyword for said each occurrence of each said word to yield a weight by texts to each said word, wherein said means for defining said degree of importance includes means for weighting each of said word occurrence counts with said weight by text.

41. A system as defined in claim 28, further comprising means for weighting said degree of importance with a weight associated with an attribute of each said word in said selected texts.

42. A system as defined in claim 28, further comprising means, responsive to a determination that any inclusion relation is found either in any two of said sorted words or between any of said sorted words and any of keywords used in said query request, for selecting one of two words involved in said inclusion relation on a basis of a predetermined criterion.

43. A system as defined in claim 42, further comprising means for setting said predetermined criterion for a comparison of lengths between said two words involved in said inclusion relation.

44. A system as defined in claim 42, further comprising means for setting said predetermined criterion for a comparison of degrees of importance between said two words involved in said inclusion relation.

45. A system as defined in claim 42, wherein said means for selecting one of two words includes means for selecting a shorter words and/or a difference between said two words.

46. A system as defined in claim 30, further comprising:
   means, operative on a basis of keywords used in said query request and said list from said function, for sorting said list in order of degrees of congruity of said selected texts; and
   means for assigning each of said selected texts of said sorted list a predetermined weight, wherein said means for expressing said degree of importance includes means for weighting said word occurrence count WOr (Wj) with one of said predetermined weights associated with each said retrieved text RTr.

47. A system as defined in claim 28, further comprising means for classifying said sorted words by attributes of said sorted words into groups of similar keywords for display.

48. A system as defined in claim 28, further comprising means for classifying said sorted words by statistical data of said sorted words into groups of similar keywords for display.

49. A system as defined in claim 28, further comprising means for classifying said sorted words by a thesaurus into groups of similar keywords for display.

50. A system as defined in claim 47, further comprising means for displaying representative keywords in place of said groups.

51. A system as defined in claim 48, further comprising means for displaying representative keywords in place of said groups.

52. A system as defined in claim 49, further comprising means for displaying representative keywords in place of said groups.

53. A system as defined in claim 28, wherein said means for assisting said user includes means, responsive to a predetermined input from said user, for automatically generating said query request by using at least a part of said predetermined number of said related words.

54. A system as defined in claim 28, further comprising means for storing said predetermined number of said related words; and
   means responsive to a predetermined input from said user for displaying said stored predetermined number of said related words.

55. A text retrieval system capable of assisting a user to search a text base by providing keywords on the basis of at least one preceding search, the text retrieval system comprising:
   a multiplicity of texts constituting said text base;
   means for managing attribute information on said texts constituting said text base;
   means, operative for each of texts constituting said text base, for managing local statistical information on words used in each said text;
   means for managing global statistical information on words used in any of said texts constituting said text base;
   means for permitting said user to issue a query request;
   means responsive to said query request for providing a list of text IDs of selected texts;
   means, operative for each of words contained in said selected texts listed in said selected text list, for calculating a degree of importance by using said local statistical information for said retrieval texts and said global statistical information;
   means for sorting said words contained in said selected texts in order of said degrees of importance;
   means for displaying a predetermined number of said sorted words with highest degrees of importance as related keywords; and
   means for assisting said user to enter a query request by using said related keywords.

56. A system as defined in claim 55, wherein said means for managing local statistical information includes a plurality of local statistical tables each associated with one of said texts constituting said text base, a local table associated with each said text containing a word ID of each of words used in each said text and a word occurrence count associated with said word ID, said word occurrence count indicating a number of occurrences, in each said text, of each said word used in each said text,
   wherein said means for managing global statistic information includes a global statistical table for storing a word ID of each of said words used in any of said texts constituting said text base, a total word occurrence count and a containing text count which are associated with said word ID of each said word used in any said text, said total word occurrence count indicating a total number of occurrences in all of said texts constituting said text base and said containing text count indicating a number of texts containing each said word used in any said text, and
   wherein said degree of importance is proportional to a sum of said word occurrence counts taken for said selected texts, a number of said selected texts, and a quantity defined for each said word contained in said selected texts such that if each said word appears in more of said texts constituting said text base, said quantity becomes the smaller.

57. A system as defined in claim 56, wherein said degree of importance, I(Wj), is defined as:

$$I(Wj) = C * \sum_{r=1}^{R} \{WOr(Wj) * IDF(Wj)\} * RCT(Wj),$$

where Wj is a word ID of each said word contained in said selected texts, C is a constant,
   WOr(Wj) is said word occurrence count of each said word Wj in each said retrieved text
   RTr, RCT(Wj) is a number of said selected texts which contain each said word Wj, and
   IDF(Wj) is said quantity, where RTr is a text ID of each said retrieved text and r=1, 2, . . . , R (R=a number of selected texts).

58. A system as defined in claim 55, further comprising:
   means, responsive to a determination that a first query request and a second query request issued after said first one have resulted in a first list of first text IDs of first selected texts and a second list of second text IDs of second selected texts such that said second list is a subset of said first list, for calculating a distribution index for each said word contained in said first selected texts by using statistical information on words used in said first selected texts and statistical information on words used in said second selected texts, said distribution index being so defined that if each word is distributed in more of texts listed in said second list and distributed in less of said first selected texts, said index of the word becomes larger, and means for weighting said degree of importance with said distribution index.

59. A system as defined in claim 58, wherein said distribution index is expressed as $\{(MA/CTA(Wj))*(CTB(Wj)/MB)\}$, where MA and MB are numbers of texts listed in said list and said smaller list, respectively, and $CTA(Wj)$ and $CTB(Wj)$ are numbers of texts which are listed in said list and said smaller list, respectively, and which contain each said word Wj contained in said selected texts.

60. A system as defined in claim 56, wherein said list is sorted in order of degrees of congruity of said selected texts, wherein the system further comprises means for receiving said sorted list and assigning each of said selected texts of said sorted list a predetermined weight, and wherein said means for calculating said degree of importance includes means for weighting said word occurrence count with said predetermined weight.

61. A system as defined in claim 55, further comprising:
means, operative for each said word contained in said selected text, for making a test to see if a number of texts containing the word is within a predetermined range; and
means, responsive to a determination that said word did not pass said test, for excluding said word from candidates of said related keywords.

62. A system as defined in claim 56, further comprising:
means, operative for each of texts constituting said text base, for managing each occurrence of each said word in each said text constituting said text base and a part, of each said text, of said each occurrence;
means for assigning each of possible parts of each said test a predetermined weight factor; and
means operative for each said text for accumulating said predetermined weight factor associated with said part of said each occurrence of each said word to yield a weight by text to each said word, wherein said means for defining said degree of importance includes means for weighting each of said word occurrence counts with said weight by text.

63. A system as defined in claim 55, further comprising:
means, operative for each of texts constituting said text base, for managing each occurrence of each said word in each said test constituting said text base and a location, in each said text, of said each occurrence;
means for calculating, for said each occurrence of each said word in each said text, a distance between said location and a location of each of keywords used in said query request;
means for assigning each of predetermined distance ranges a predetermined weight factor; and
means, operative for each of texts constituting said test base, for accumulating said predetermined weight factor associated with said distance for each said keyword for said each occurrence of each said word to yield a weight by texts to each said word, wherein said means for defining said degree of importance includes means for weighting each of said word occurrence counts with said weight by text.

64. A system as defined in claim 55, further comprising means for weighting said degree of importance with a weight associated with an attribute of each said word in said selected texts.

65. A system as defined in claim 55, further comprising means, responsive to a determination that any inclusion relation is found either in any two of said sorted words or between any of said sorted words and any of keywords used in said query request, for selecting one of two words involved in said inclusion relation on a basis of a predetermined criterion.

66. A system as defined in claim 64, further comprising means for setting said predetermined criterion for a comparison of lengths between said two words involved in said inclusion relation.

67. A system as defined in claim 64, further comprising means for setting said predetermined criterion for a comparison of degrees of importance between said two words involved in said inclusion relation.

68. A system as defined in claim 64, wherein said means for selecting one of two words includes means for selecting a shorter words and/or a difference between said two words.

69. A system as defined in claim 57, further comprising:
means, operative on a basis of keywords used in said query request and said list from said function, for sorting said list in order of degrees of congruity of said selected texts; and
means for assigning each of said selected texts of said sorted list a predetermined weight, wherein said means for expressing said degree of importance includes means for weighting said word occurrence count $WOr(Wj)$ with one of said predetermined weights associated with each said retrieved text RTr.

70. A system as defined in claim 55, further comprising means for classifying said sorted words by attributes of said sorted words into groups of similar keywords for display.

71. A system as defined in claim 70, further comprising means for displaying representative keywords in place of said groups.

72. A system as defined in claim 55, wherein said means for assisting said user includes means, responsive to a predetermined input from said user, for automatically generating said query request by using at least a part of said predetermined number of said related words.

73. A system as defined in claim 55, further comprising means for storing said predetermined number of said related words; and
means responsive to a predetermined input from said user for displaying said stored predetermined number of said related words.

74. A system as defined in claim 55, further comprising a storage media drive adapted for a detachable mass storage medium, wherein said multiplicity of texts constituting said text base are stored in one of said detachable mass storage media.

75. A system as defined in claim 55, further comprising a two way communication means, wherein the system is distributed on a server and client system.

* * * * *